United States Patent [19]
Grosse

[11] Patent Number: 5,931,414
[45] Date of Patent: Aug. 3, 1999

[54] MISSILE FOR COMBATTING MOVING TARGETS

[75] Inventor: Matthias Grosse, Aufham, Germany

[73] Assignee: Buck Werke GmbH & Co., Bad Ueberkingen, Germany

[21] Appl. No.: 08/868,959

[22] Filed: Jun. 5, 1997

[30] Foreign Application Priority Data

Jun. 28, 1996 [DE] Germany .......................... 196 26 075

[51] Int. Cl.⁶ .................................................. B64C 27/00
[52] U.S. Cl. ........................... 244/62; 244/55; 244/53 A; 244/3.15; 89/1.8; 89/1.813
[58] Field of Search .......................... 244/3.1, 55, 53 A, 244/3.15, 62; 89/1.8, 1.813

[56] References Cited

U.S. PATENT DOCUMENTS 5,238,204  8/1993  Metz ...................................... 244/3.15
5,788,179  8/1998  Wicke ................................... 244/3.15

*Primary Examiner*—J. Woodrow Eldred
*Attorney, Agent, or Firm*—Hill & Simpson

[57] ABSTRACT

A missile, in particular for combatting moving targets, has several propulsion units arranged one after the other along the longitudinal axis of the missile. At least two propulsion units arranged one after the other can be operated simultaneously, and the missile contains an ignition control that is set up for optional ignition of these propulsion units at the same time or successively.

16 Claims, 2 Drawing Sheets

MISSILE FOR COMBATTING MOVING TARGETS

BACKGROUND OF THE INVENTION

The present invention relates to a missile, in particular for combatting moving targets such as airplanes, helicopters or the like, in which several propulsion units are arranged one after the other along its longitudinal axis, as well as a method for controlling the thrust of such a missile.

A prior art missile is describe in German reference DE 27 36 547 C1.

For combatting aircraft, helicopters or the like in the direct shot method (LOS method), prior art missiles can accelerate to a maximum speed of up to Mach 2.5 with a short thrust impulse of approximately 2.5 seconds in duration.

In the LOS method, at the time of launch there is already visual contact with the target. If at the start it has already been switched to the target, a corresponding missile follows a flight path which in the simplest case can be described by the steering law of proportional navigation. For combatting flying targets with the NLOS method, that is, flying targets to which there exists no visual connection, for example, concealed helicopters, missiles having a seeker head are known that scan a seek area with the seeker head and turn onto a course to the target after target detection. The typical path of such a missile consists of a start phase, in which the missile climbs to seek altitude in a relatively steep path, a seek phase, in which the missile flies along a relatively flat path and the seeker head scans the seek area for possible targets, and a final approach run phase, in which a target is detected and the missile flies to the detected target, which as a rule lies well below the seek altitude. The image processing speed of the seeker head sets a limit for the speed of the missile during the seek phase, which for example can be in the range from Mach 1.0 to Mach 1.2. In combatting a target at close range (at a distance of about 1000 m to 1500 m from the launch point), the missile must in addition follow a relatively narrow path radius in order to move from the seek phase into the final approach phase. If the speed of the missile is too great, this radius can no longer be followed. An additional limit for the speed during the seek phase results from this.

Missiles provided for use in the LOS method have a disadvantageous profile for use in the NLOS method, since at close range their speed is too great for the required narrow path radius during the transition to the approach run, and at long range (at distances of about 6000 m or more from the launch point) the cross-acceleration capacity is too low due to the drop in speed. Conversely, the known missiles for the NLOS method cannot immediately after the start achieve the high speeds required for the LOS method, since they are designed for an acceleration to a comparatively low speed in the seek phase.

German reference DE 27 36 547 C1, discloses a rocket with several propulsion unit stages arranged one after the other that are successively burned. However, the speed after the start phase is thereby determined by the thrust force of the first propulsion unit, so that the disadvantage remains that this speed is either too small for use in the LOS method or is too great for combatting targets at close range according to the NLOS method.

The aim of the present invention is to create a missile of the type named above that is suited both for combatting targets according to the LOS method and also for combatting targets at close range according to the NLOS method, as well as providing corresponding thrust regulation methods.

For the solution of this aim, it is inventively provided that in a missile of the type named above at least two propulsion units can be operated at the same time, and the missile comprises an ignition control means that can optionally ignite these two propulsion units simultaneously or successively.

According to the present invention, the thrust profile can be varied both with respect to the strength of the thrust and also with respect to the temporal course of the thrust. This makes it possible to use the same missile both in the LOS method and in the NLOS method. Before the launch, an item of information is inputted to the ignition control means concerning whether the missile is used in the LOS or the NLOS method. If the LOS method is selected, the ignition control means ignites the propulsion units simultaneously or shortly after one another. If the NLOS method is selected, the ignition control means ignites the second propulsion unit corresponding to a stored ignition program, for example, when the target is detected or after a predetermined time. Several ignition programs of this type, matched to different types of use and target types, can be stored in the ignition control means. The ignition program relevant for the respective use is selected before launching or is determined automatically by the missile on the basis of seeker head information. For the use in the NLOS method for combatting targets at close range, it is for example, not absolutely necessary to ignite an additional propulsion unit, as long as a sufficient speed is given when the target is detected. However, an additional acceleration in the final approach phase by means of an additional propulsion unit is advantageous for the improvement effect in the target. If no target detection ensues, the seek area can be enlarged by the ignition of an additional propulsion unit during the seek phase.

SUMMARY OF THE INVENTION

It is an object of the present invention to provide that the temporal distance between the ignition of two propulsion units is variable.

In addition, the missile has a seeker head for the detection of possible targets in a target area. The ignition control means is set up to ignite a first propulsion unit in a start phase in order to bring the missile to a predetermined seek height, and to ignite at least one additional propulsion unit after the seeker head has detected a target.

In the present invention the ignition control means is set up to ignite a propulsion means after the missile has swung into the sight line to the target in the approach run, in particular in order to quickly reach even targets at the edge of the seek area with the use of NLOS and to improve the effect at the target.

The missile has a seeker head for the detection of possible targets in a target area. The ignition control means is set up to ignite a propulsion unit after a predetermined time period after launch, if the seeker head has not detected a target during this time.

In addition, the missile has a rudder positioning system with folding or tilting bearer surfaces, whereby a first propulsion unit is arranged in the longitudinal direction in front of the central module and a second propulsion unit is arranged in the longitudinal direction behind the central module.

The ignition control system is housed in the central module.

In the present invention the ignition control means ignites the propulsion unit lying in front of the central module before the propulsion unit lying behind the rudder control system, if these propulsion units are not ignited simultaneously.

The ignition control means has a programming means with an interface for the inputting of information concerning the ignition of the propulsion units.

In the present invention at least one propulsion unit is a solid fuel rocket propulsion unit.

Furthermore, at least one propulsion unit can be multiply ignited.

The present invention furthermore provides a method for controlling thrust in a missile for combatting moving targets with a seeker head for target location, comprising the following steps: emission of a thrust impulse for achieving a predetermined seek altitude and a predetermined seek speed, and emission of an additional thrust impulse after the missile has achieved the seek altitude.

The additional thrust impulse is emitted after the detection of a target by the seeker head.

In addition, a thrust impulse is emitted after the missile has swung into the sight line to the target.

Moreover, a thrust impulse is emitted after a predetermined time interval after the start, if no target has been detected.

BRIEF DESCRIPTION OF THE DRAWINGS

The features of the present invention which are believed to be novel, are set forth with particularity in the appended claims. The present invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
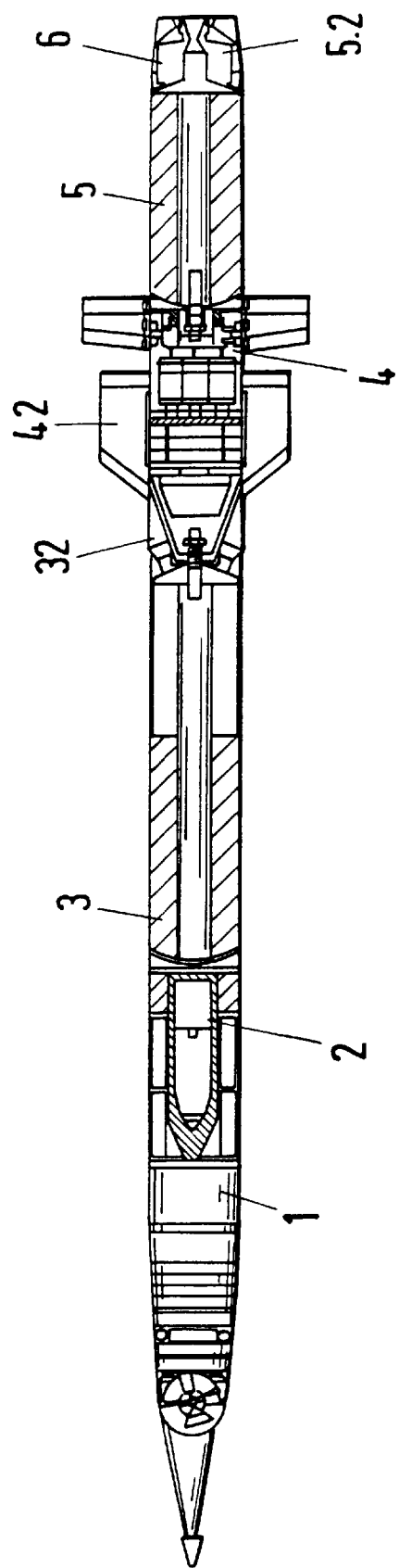
FIG. 1 shows a cross-section through an inventive missile.

FIG. 1 shows an example of an inventive missile. In this missile, a seeker head 1, a warhead 2, a first propulsion unit 3, a central module 4 with a rudder positioning system, a second propulsion unit 5 and a launch propulsion unit 6 are arranged one after the other in the axial direction.

The seeker head 1 is provided with an image acquisition and image processing means that is set to the target to be combatted. For the combatting of airplanes or helicopters, the seeker head can be equipped with a scanning IR optics and an IR matrix sensor, as well as an associated image processing means, as specified in German reference DE 37 33 681 C1 (corresponding to U.S. Pat. No. 5,400,134 hereby incorporated by reference), to which reference is made with respect to the details of such a seeker head.

The first propulsion unit 3 is a solid fuel rocket propulsion unit, and has several (for example, four) jet nozzles 32, oriented at an acute angle to the longitudinal axis of the missile. On the basis of the orientation of these nozzles, the propulsion 3 can be operated without damaging the parts behind it, so that the propulsion unit 3 and the propulsion unit 6 can be ignited at the same time.

On the external side of the central module 4, several (for example, four) folding or tilting bearer surfaces 42, which are extended after the launch, are attached to produce lift. The electronic components for energy supply and for the steering of the missile via the rudder positioning system, as well as the ignition control system for igniting the propulsion units, are housed in the central module 4. In addition, the central module 4 has an interface (not shown) via which the items of information concerning the type of targets to be combatted and type of use (LOS or NLOS) can be inputted. In the simplest case, this interface can be formed by means of a corresponding switch or a keyboard. However, it can also be a data interface connected with a data processing unit in the central module 4.

The propulsion unit 5 is, like the propulsion unit 3, a solid fuel rocket propulsion unit, and comprises a central jet nozzle 5.2. The launch propulsion unit 6 is a conventional rocket propulsion unit for the discharge of the missile from a start means, and after the launch can be blown off or can remain on the missile. In the present example, both propulsion units are constructively integrated.

For use in the LOS mode, a corresponding item of information concerning the interface of the central module 4 is inputted into the ignition control system for the propulsion units. This ignition control system then, after the launch, ignites the two propulsion units 3 and 5 at the same time or one shortly after the other, so that the thrust of two propulsion units is available, and the missile can be accelerated quickly to the required speed. For particular situations, it can be advantageous to ignite the propulsion unit 5 with a short delay. However, the propulsion units 3 and 5 are advantageously in simultaneous operation, at least for a certain time.

For use in the NLOS method, corresponding to an input via the interface of the central module after the start and blowing off of the launch propulsion unit 6, the front propulsion unit 3 is first ignited, lending the missile enough thrust to reach the required seek height.

Figure 2:
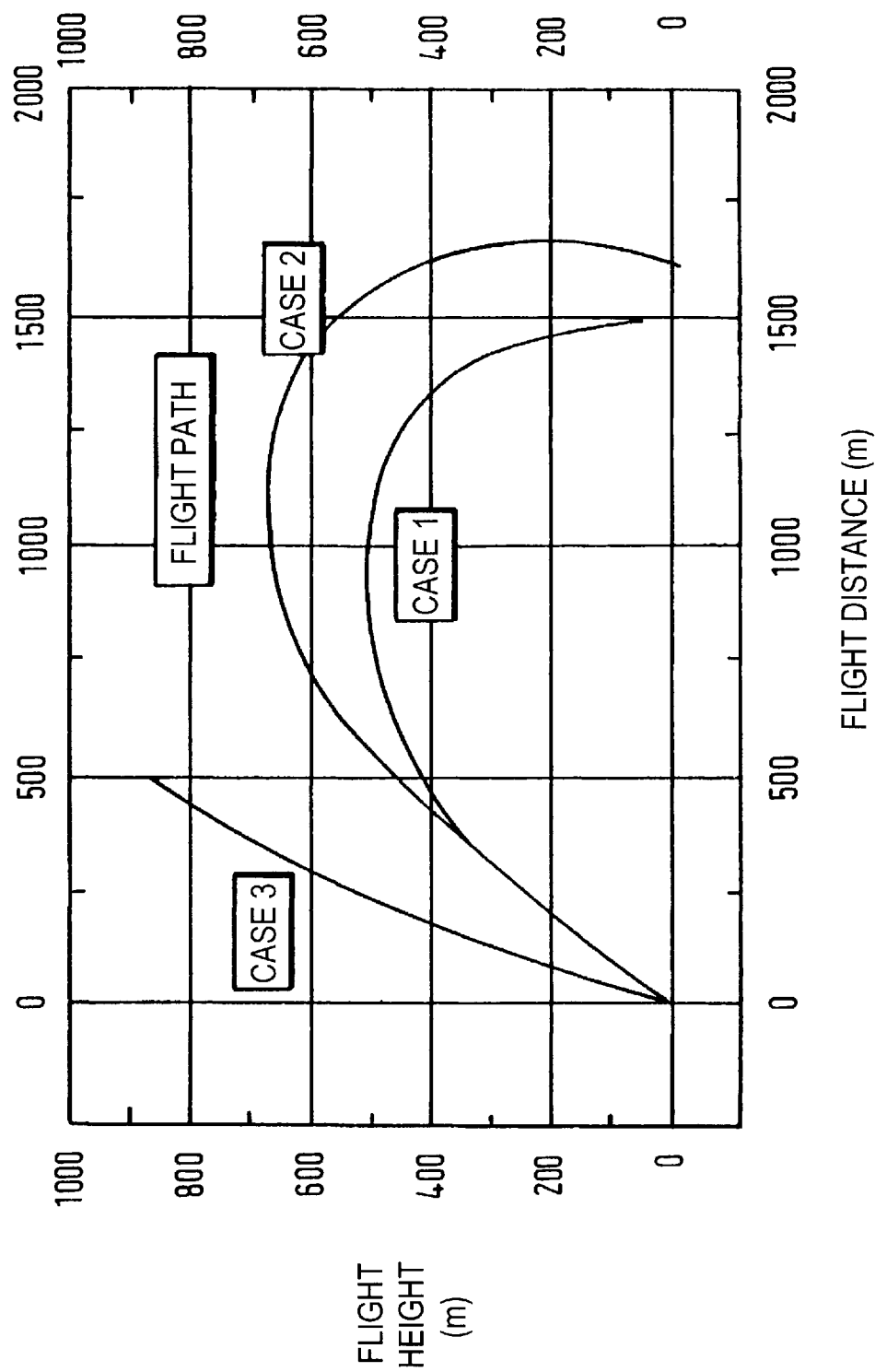
FIG. 2 shows the flight paths during a close-range shot in the NLOS method for an inventive missile and an LOS missile according to the prior art.

After the seek height has been reached, the missile swings into a flat seek path, and scans the target area for possible targets. If the seeker head has detected a target, the missile swings into the sight line to the target and the propulsion unit 5 is ignited for acceleration in the approach run. The curve for case 1 in FIG. 2 shows as an example the flight path of an inventive missile during the combatting of a target at a distance of 1500 m from the launch point in the NLOS method, whereby the second propulsion unit 5 is ignited after target detection. As can be seen, the target is hit correctly. For comparison, the curve for case 2 in FIG. 2 shows the case in which the second propulsion unit 5 is ignited immediately after the burning out of the first propulsion unit 3, which corresponds to the flight behavior of a conventional LOS missile. In this case the target is missed, since the narrow path radius required for the introduction of the final approach run cannot be flown after the target recognition. This also cannot be compensated by a steeper launch angle, as the curve for case 3 shows, in which the second propulsion unit is likewise ignited immediately after the burning out of the first propulsion unit, since here the permissible squint angle of the seeker head is exceeded.

If in the seek flight phase no target is detected within a predetermined time, the second propulsion unit 5 is likewise ignited and the seek flight is continued. In this way a larger range can be achieved in relation to a missile with only a single propulsion unit. The time of ignition of the second propulsion unit 5 is usefully chosen so that a maximum flight time is not exceeded for the overall range. In order then to still achieve an acceleration in the approach run if the second propulsion unit 5 is ignited in the seek flight, in a modification of the represented embodiment an additional propulsion unit can be provided for the acceleration of the warhead 2 in the approach run. This propulsion unit can be provided either behind the warhead 2, whereby the propulsion unit 3, the central module 4 with the rudder positioning system, and the propulsion unit 5 are then blown off after the sight line has been swung into. Alternatively, the additional propulsion unit can also be arranged behind the propulsion unit 5. In this case, it comprises a central jet nozzle, while the propulsion unit 5, like the propulsion unit 3, is provided with jet nozzles that are inclined at an acute angle in relation to the longitudinal axis.

The embodiment specified above can be varied in various respects. Thus, in place of a solid-fuel rocket propulsion unit, a liquid fuel rocket propulsion unit or ram jet engine can for example be used. If the second propulsion unit 5 is operated with liquid fuel, it is also possible temporarily to shut off this propulsion unit, and to reignite it if necessary, for example, for the prolongation of the seek flight phase or for acceleration in the approach run. For use in the NLOS method, the rear propulsion unit 5 can also first be ignited. It can thereby be provided to blow off the central module with the rudder positioning system and the rear propulsion unit 5 after target detection, while in the LOS method such a blowing off is omitted. The ignition criteria named above can be implemented in various stored ignition programs that are selected before launching. However, they can also be implemented in an ignition program as alternatives, whereby the ignition control means selects the matching alternative on the basis of the data acquired during the flight.

The features of the present invention disclosed in the above specification, the drawings and the claims can be essential for the realization of the present invention in its various embodiments, both individually and also in arbitrary combination.

The present invention is not limited to the particular details of the method and apparatus depicted and other modifications and applications are contemplated. Certain other changes may be made in the above described method and apparatus without departing from the true spirit and scope of the present invention herein involved. It is intended, therefore, that the subject matter in the above depiction shall be interpreted as illustrative and not in a limiting sense.

What is claimed is:

1. A missile, comprising:
   a plurality of propulsion units arranged one after the other along a longitudinal axis of the missile;
   at least two propulsion units that are arranged one after the other being simultaneously ignitable;
   an ignition controller that ignites said plurality of propulsion units, said ignition controller igniting simultaneously at least said at least two propulsion units.

2. The missile according to claim 1, wherein temporal spacing between ignition of two propulsion units of the plurality of propulsion units is variable.

3. The missile according to claim 2, wherein the missile further comprises a seeker head for detection of targets in a target area, and wherein the ignition controller is structured to ignite a first propulsion unit of the plurality of propulsion units in a start phase to bring the missile to a predetermined seek height, and to ignite at least one additional propulsion unit of the plurality of propulsion units after the seeker head has detected a target.

4. The missile according to claim 3, wherein the ignition controller is structured to ignite a propulsion unit of the plurality of propulsion units after the missile has swung into a sight line to a target during an approach run of the missile.

5. The missile according to claim 1, wherein the missile has a seeker head for detection of targets in a target area, and wherein the ignition controller is structured to ignite a propulsion unit of the plurality after a predetermined time after the launch, if the seeker head has not detected a target during said predetermined time.

6. The missile according to claim 1, wherein the missile further comprises a central module with folding or tilting bearing surfaces as a rudder positioning system, wherein a first propulsion unit of the plurality of propulsion units is arranged in a longitudinal direction in front of the central module and wherein a second propulsion unit of the plurality of propulsion units is arranged in a longitudinal direction behind the rudder positioning system.

7. The missile according to claim 6, wherein the ignition controller is housed in the central module.

8. The missile according to claim 6, wherein the ignition controller ignites the first propulsion unit that is in front of the central module before the second propulsion unit that is behind the rudder control system, if said first and second propulsion units are not ignited simultaneously.

9. The missile according to claim 1, wherein the ignition controller has a programming device with an interface for inputting information regarding ignition of the plurality of propulsion units.

10. The missile according to claim 1, of the plurality of propulsion units, wherein at least one propulsion unit is a solid fuel rocket propulsion unit.

11. The missile according to claim 1, wherein at least one propulsion unit of the plurality of propulsion units is multiply ignitable.

12. A missile for combatting moving targets, comprising:
   a seeker head for the detection of targets in a target area;
   a plurality of propulsion units arranged one after the other along a longitudinal axis of the missile;
   at least two propulsion units of the plurality of propulsion units that are arranged one after the other, being at least simultaneously operable;
   an ignition control device that is structured to ignite said at least two propulsion units with a temporal spacing such that ignition of the at least two propulsion units is one of simultaneously or successively; and
   the ignition control device being structured to ignite a first propulsion unit of the plurality of propulsion units in a start phase to bring the missile to a predetermined seek height, and to ignite at least one additional propulsion unit of the plurality of propulsion units after the seeker head has detected a target.

13. The missile according to claim 12, wherein the ignition control device is structured to ignite a propulsion unit of the plurality of propulsion units after the missile has swung into a sight line to a target during an approach run of the missile.

14. The missile according to claim 12, wherein the ignition control device is structured to ignite a propulsion unit of the plurality of propulsion units after a predetermined time after launch of the missile, if the seeker head has not detected a target during said predetermined time.

15. The missile according to claim 12, wherein the missile further comprises a central module with a rudder positioning system, wherein a first propulsion unit of the at least two propulsion units is arranged in the longitudinal direction in front of the central module and a second propulsion unit of the at least two propulsion units is arranged in the longitudinal direction behind the rudder positioning system, and wherein the ignition control device ignites the first propulsion unit lying in front of the central module before igniting the second propulsion unit lying behind the rudder control system, if said first and second propulsion units are not ignited simultaneously.

16. The missile according to claim 12, wherein at least one propulsion unit of the plurality of propulsion units is a solid fuel rocket propulsion unit.

* * * * *